United States Patent
Lai

[19]

[11] Patent Number: 6,091,041
[45] Date of Patent: Jul. 18, 2000

[54] ELECTRIC DISCHARGE MACHINE

[76] Inventor: Ton-Shih Lai, No. 52-26, Kuang Min Road, Hsi Tun Area Taichung, Taiwan

[21] Appl. No.: 09/225,722

[22] Filed: Jan. 6, 1999

[51] Int. Cl.$^7$ ................................. B23H 1/00; B23H 7/26
[52] U.S. Cl. ....................................... 219/69.11; 219/69.2
[58] Field of Search ............................... 219/69.11, 69.2, 219/69.15, 69.17, 69.12

[56] References Cited

FOREIGN PATENT DOCUMENTS 61-297012  12/1986  Japan .
62-176765   8/1987  Japan .................................. 219/69.11

Primary Examiner—Geoffrey S. Evans
Attorney, Agent, or Firm—Browdy and Neimark

[57] ABSTRACT

An electric discharge machine is intended to effect a finishing surface on the circumferential surface of a cylindrical workpiece such that the finishing surface is parallel to the circumferential surface of the cylindrical workpiece. The machine is composed of a platform base, a work platform, a main shaft seat, and a workpiece holding device. The work platform is slidably mounted on the platform base such that the work platform slides horizontally in relation to the platform base. The main shaft seat is slidably mounted on the platform base such that the main shaft seat slides along the direction of a normal line of the work platform, and that the main shaft seat is fastened at one end thereof with a discharge finishing electrode facing the work platform. The workpiece holding device is mounted on the work platform for holding the cylindrical workpiece. When the work platform is driven to slide horizontally in relation to the platform base, the cylindrical workpiece is rotated. As the cylindrical workpiece is moved to pass the projection of the electrode on the work platform, the circumferential surface of the cylindrical workpiece is spread out to form a planar surface relative to the electrode, so as to facilitate the finishing of the circumferential surface of the cylindrical workpiece by the discharge finishing electrode.

13 Claims, 7 Drawing Sheets

ELECTRIC DISCHARGE MACHINE

FIELD OF THE INVENTION

The present invention relates generally to an electric discharge machine, and more particularly to an electric discharge machine capable of bringing about a discharge finishing surface on the circumferential surface of a cylindrical work piece such that the discharge finishing surface is parallel to the circumferential surface of the cylindrical work piece.

BACKGROUND OF THE INVENTION

The electric discharge machine is generally used in the finishing process of various plastic forming molds, press casting molds, forging molds, etc. There are two types of the discharge finishing. The first type makes use of a discharge finishing electrode of a specific profile. The specific profile is projected on an embossed mold discharge finishing of a work piece. Thereafter, the linear discharge finishing electrode is used to effect a linear cut discharge finishing of two dimensional profile on the work piece. As far as the die-sinking mold discharge finishing is concerned, the finishing surface is a two-dimensional surface, due to the limitations of its finishing principle and the shape of the finishing electrode. As a result, it can not bring about a finishing surface which is parallel to the circumferential surface of the cylindrical work piece. In other words, the finishing surface formed on the circumferential surface of the work piece is a planar surface rather than an arcuate surface. The vertical distances between any two points of the finishing surface and the circumferential surface of the work piece are different. As a result, the finishing capability of the electric discharge machine is limited.

SUMMARY OF THE INVENTION

The primary objective of the present invention is to provide an improved electric discharge machine capable of effecting on a circumferential surface of a cylindrical work piece a discharge finishing surface which is parallel to the circumferential surface.

The objective of the present invention is attained by the electric discharge machine consisting of a platform base, a work platform, a man shaft seat, and a work piece holding device. The work platform is mounted slidably on the platform base. The main shaft seat is mounted on the platform base such that the main shaft seat is capable of sliding along the direction of the work platform normal line, and that the main shaft seat is provided at one end thereof with a discharge finishing electrode facing the work platform. The work piece holding device is mounted on the work platform for holding a cylindrical work piece such that the cylindrical work piece is rotated at the time when the work platform slides horizontally on the platform base. As the cylindrical work piece passes the position of the projection of the electrode, the finishing of the circumferential surface of the cylindrical work piece is effected by the electrode.

The objective, features and functions of the present invention will be more readily understood upon a thoughtful deliberation of the following detailed description of the embodiments of the present invention with reference to the accompanying drawings.

DETAILED DESCRIPTION OF THE INVENTION

Figure 1:
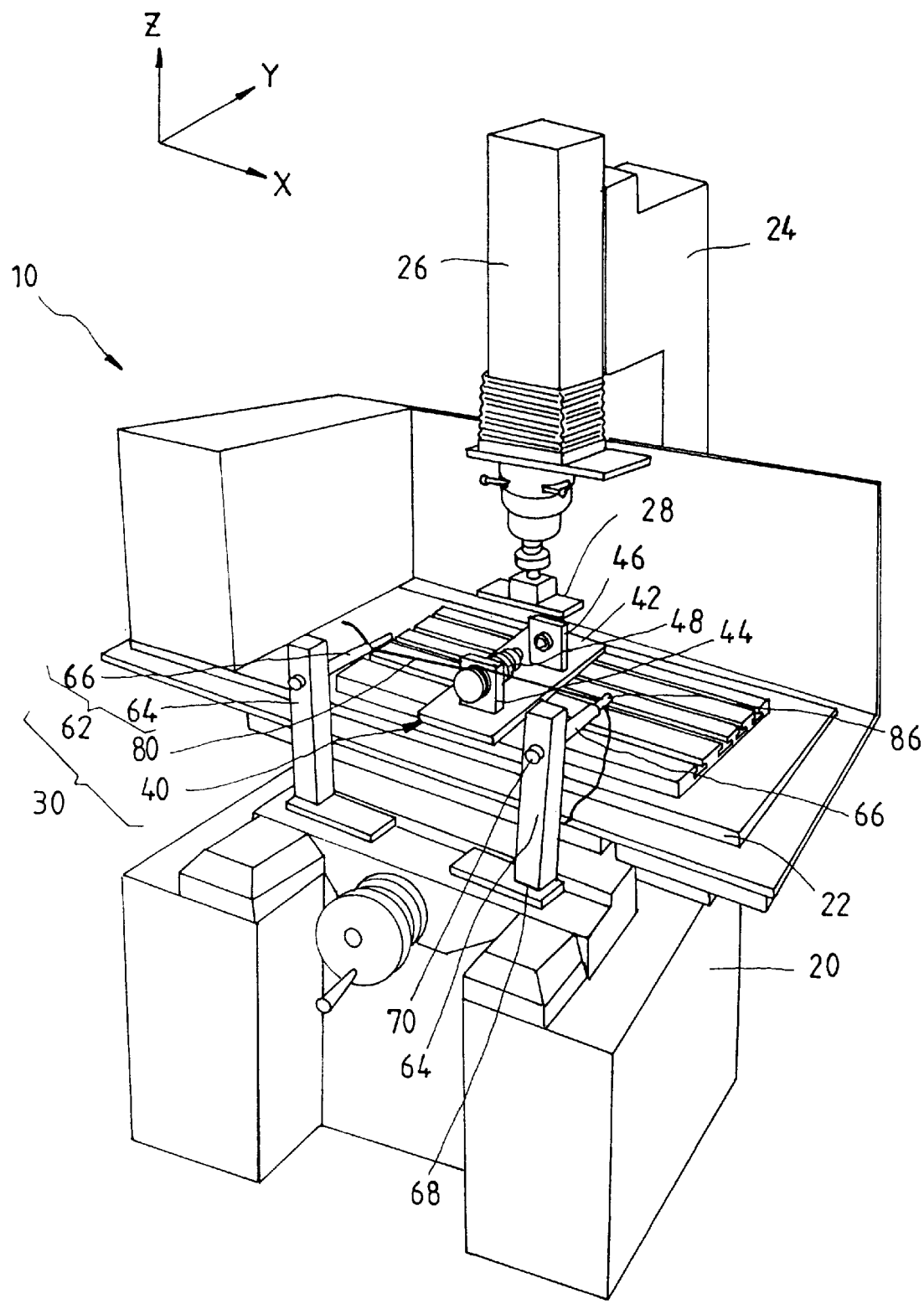
FIG. 1 shows a perspective view of a first preferred embodiment of the present invention.
Figure 2:
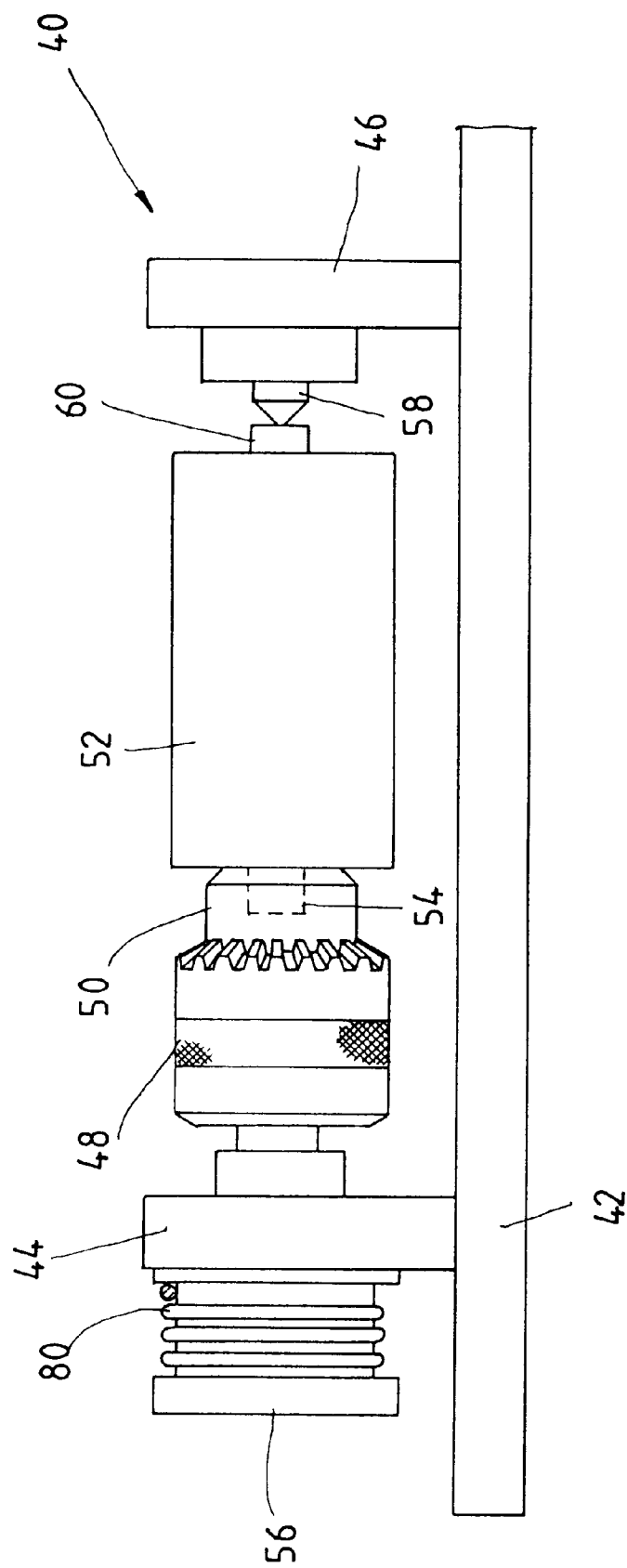
FIG. 2 shows a partial side view of a work piece holding device of the first preferred embodiment of the present invention.

As shown in FIGS. 1–6, an electric discharge machine 10 of the first preferred embodiment of the present invention is composed of a platform base 20, a discharge finishing electrode 28, and a workpiece holding device 30.

The platform base 20 is provided on the top thereof with a work platform 22 which is slidably mounted thereon such that the work platform 22 is capable of sliding horizontally along the direction of X axis or Y axis of the electric discharge machine 10. The platform base 20 is provided in one side thereof with an extension arm 24, and in one end thereof with a main shaft seat 26 which is capable of displacing vertically relative to the work platform 22 along the direction of a normal line of the work platform 22, which is in fact the direction of Z axis of the electric discharge machine 10. The platform base 20, the work platform 22, the extension arm 24, and the main shaft seat 26 are all similar in construction to those of the electric discharge machine of the prior art. As a result, they will not be further described.

Figure 5:
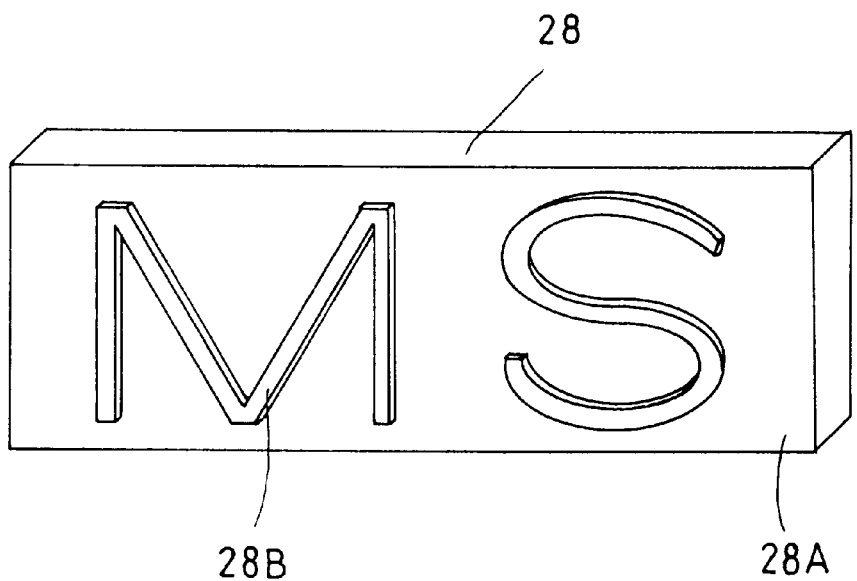
FIG. 5 shows a perspective view of a finishing electrode of the first preferred embodiment of the present invention.

The discharge finishing electrode 28 is of a platelike construction and is provided in one surface 28A thereof with an embossed pattern 28B of a predetermined shape, as shown in FIG. 5. The finishing electrode 28 is fastened with one end of the main shaft seat 26 such that the finishing electrode 28 faces the work platform 22, so as to enable the surface 28A to face the work platform 22.

The workpiece holding device 30 consists of a seat body 40, two support frames 62, and a cord 80.

The seat body 40 has a bottom board 42, a first fastening board 44 and a second fastening board 46. The first and the second fastening boards 44 and 46 are mounted on the bottom board 42 which is in turn mounted on the work platform 22. The first fastening board 44 is provided with a chuck 48 pivoted thereto. The chuck 48 is provided at one end thereof with a clamping portion 50 for holding securely one end 54 of a cylindrical workpiece 52 to be finished. The chuck 48 is fastened at other end thereof with the axial center of a wheel 56. The second fastening board 46 is provided with an urging pin 58 which is fastened pivotally therewith such that the urging pin 58 urges other end 60 of the workpiece 52.

The two support frames 62 consist of a support rod 64 and a cross rod 66. The support rod 64 is fastened at one end 68 thereof with the platform base 20. The cross rod 66 is fastened at one end 70 thereof with the support rod 64 such that the cross rod 66 extends over the work platform 22, and that the cross rod 66 is located at one side of the seat body 40.

The cord 80 is wound on the wheel 56 such that both ends 82 and 84 of the cord 80 are fastened respectively with other end 86 of each of the two cross rods 66.

Figure 3:
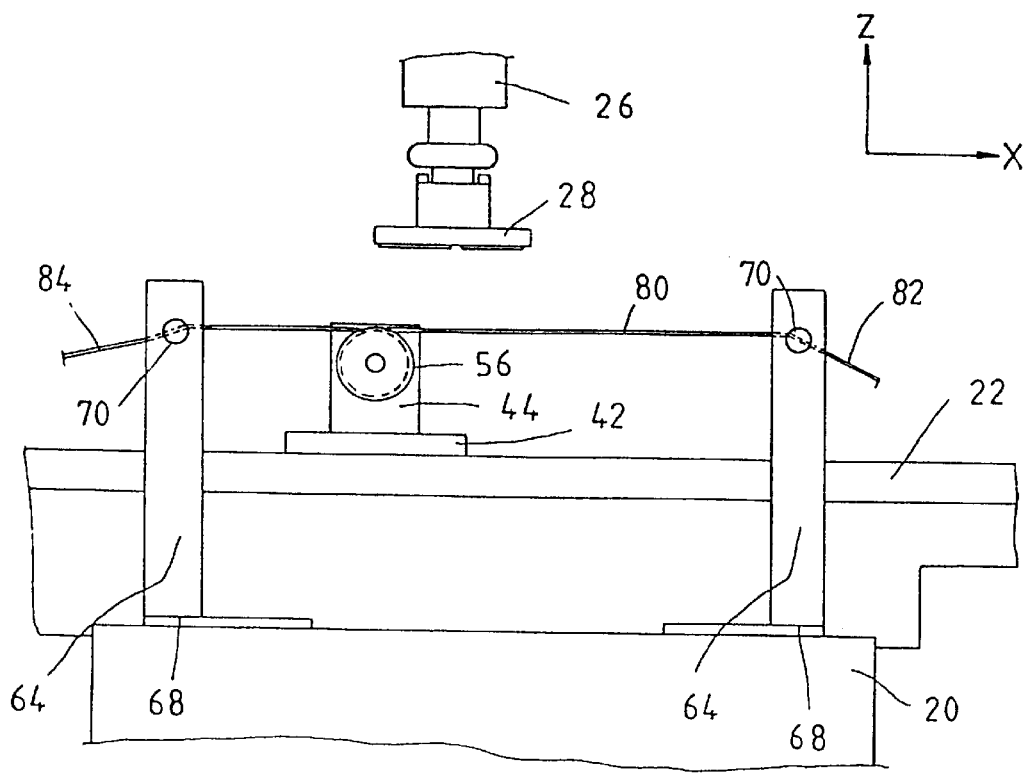
FIG. 3 shows a schematic view of the first preferred embodiment of the present invention at work.
Figure 4:
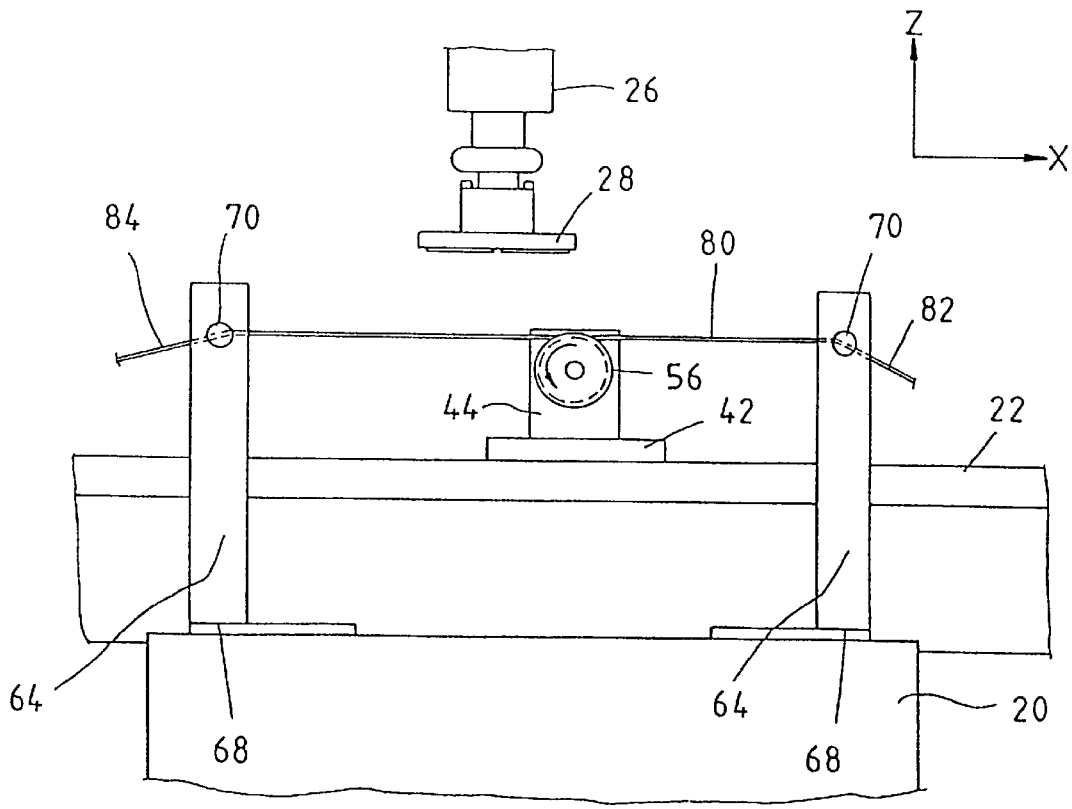
FIG. 4 shows another schematic view of the first preferred embodiment of the present invention at work.
Figure 6:
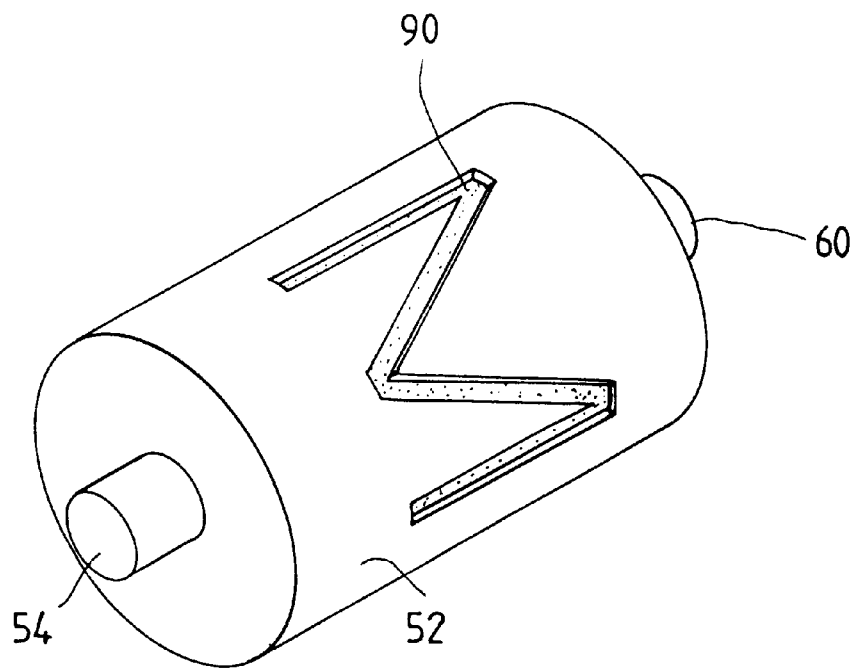
FIG. 6 shows a perspective view of a cylindrical work piece in the wake of the discharge finishing by the finishing electrode of the first preferred embodiment as shown in FIG. 5.

As shown in FIGS. 3 and 4, when the work platform 22 is driven by a servo controller (not shown in the drawings) to displace along the direction of the X axis, the wheel 56 is actuated to displace horizontally along with the work platform 22. The wheel 56 is under the influence of the tension and the friction force of the cord 80 which is wound therearound. As a result, the wheel 56 rotates around the axis of the work platform 22 such that the workpiece 52 held by the chuck 48 is caused to turn synchronously. When the workpiece 52 is so turned to pass the position of the projection of the finishing electrode 28 on the work platform 22, the circumferencial surface of the cylindrical workpiece 52 is spread out to form a working planar surface corresponding to the platelike finishing electrode 28. The work platform 22 is driven by the servo controller to slide back and forth along the direction of X axis and relative to the main shaft seat 26, so as to facilitate the finishing of the circumferential surface of the workpiece 52 by the finishing electrode 28. As a result, the circumferential surface of the workpiece 52 is provided with a recessed discharge finishing surface 90, as shown in FIG. 6. The discharge finishing surface 90 is of an arcuate shape and parallel to the original circumferential surface of the cylindrical workpiece 52.

Figure 7:
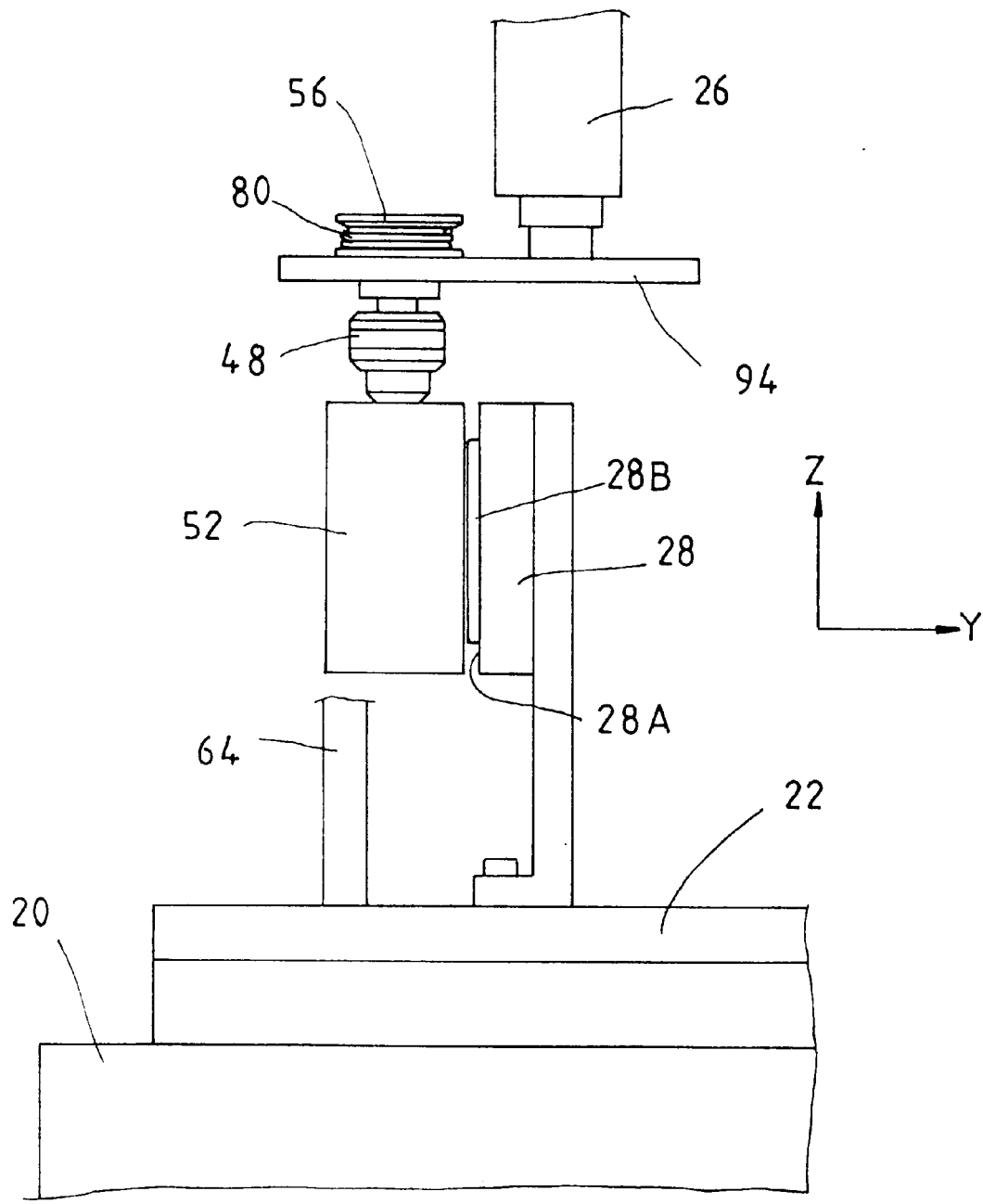
FIG. 7 shows a partial side view of a second preferred embodiment of the present invention.
Figure 8:
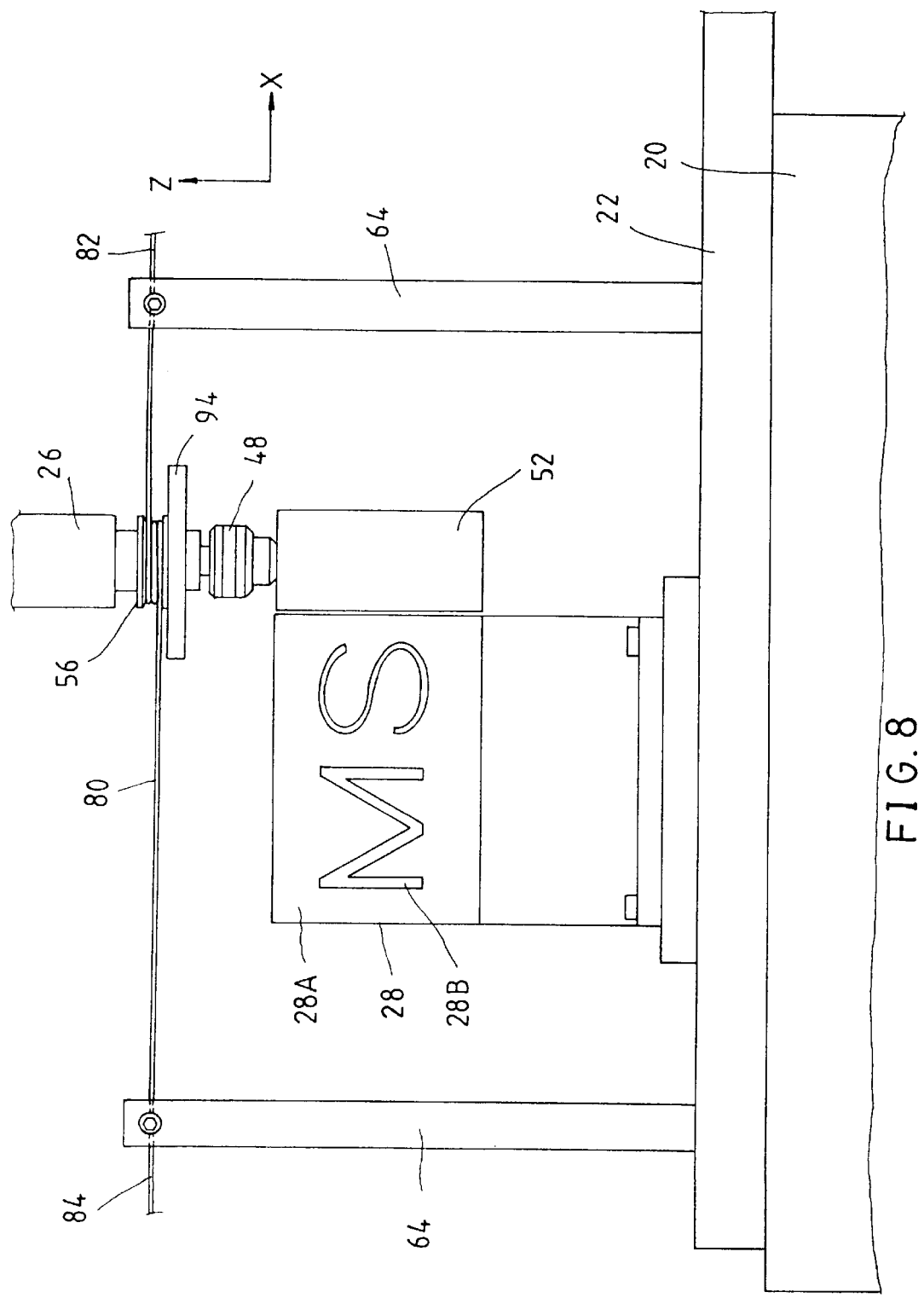
FIG. 8 shows a schematic view of the second preferred embodiment of the present invention in action.
Figure 9:
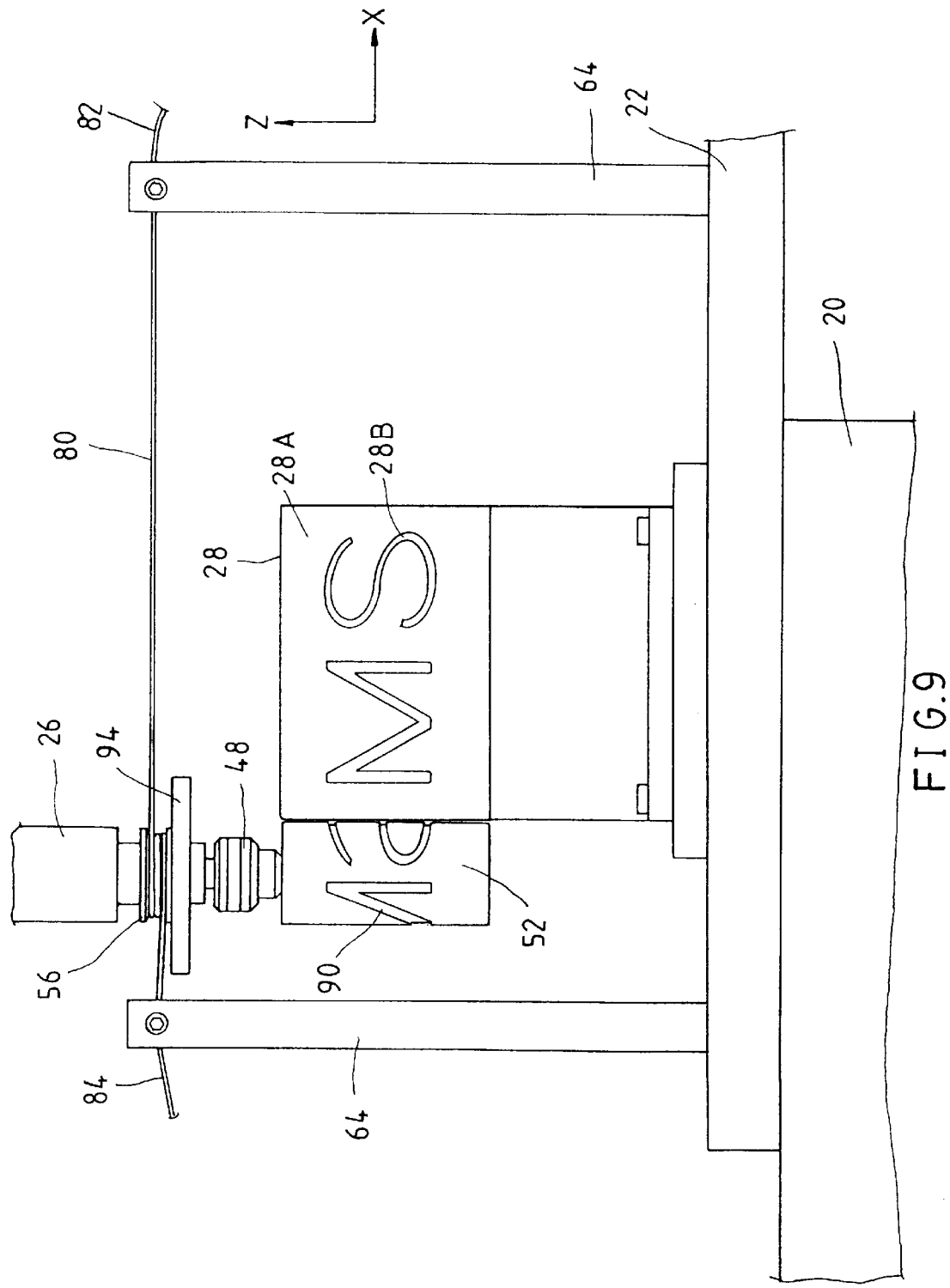
FIG. 9 shows another schematic view of the second preferred embodiment of the present invention in action.

As shown in FIGS. 7–9, the second preferred embodiment of the present invention is different from the first preferred embodiment of the present invention in that the former has the finishing electrode 28 which is mounted securely on the top of the work platform 22 such that the surface 28A of the finishing electrode 28 is perpendicular to the work platform 22. In addition, the former has two support rods 64 which are uprightly fastened with the work platform 22. Moreover, the former has the chuck 48 which is fastened pivotally with a third fastening board 94 which is in turn fastened with one end of the main shaft seat 26 such that the third fastening board 94 faces the work platform 22. Both ends 82 and 84 of the cord 80 are fastened with the top ends of the support rods 64.

When the work platform 22 is driven to slide in relation to the main shaft seat 26, the wheel 56 is under the influence of the tension and the friction force of the cord 80 which is wound on the wheel 56. The wheel 56 is actuated to rotate on the axis thereof, thereby actuating the chuck 48 to rotate synchronously. When the surface 28A of the electrode 28 is moved to pass the vicinity of the circumferential surface of the workpiece 52, the circumferential surface of the workpiece 52 is spread out to form a working planar surface, so as to facilitate the finishing of the circumferential surface of the workpiece 52 by the finishing electrode 28.

What is claimed is:

1. An electric discharge machine for effecting a finishing surface on a circumferential surface of a cylindrical workpiece, said electric discharge machine comprising:
    a platform base;
    a work platform slidably mounted on said platform base said work platform being slidable horizontally in relation to said platform base;
    a main shaft seat slidably mounted on said platform base such that said main shaft seat slides along the direction of a normal line of said work platform;
    a discharge finishing electrode fastened with one end of said main shaft seat such that said discharge finishing electrode is fixed with a planar side facing said work platform; and
    a workpiece holding device fastened on said work platform for holding securely the cylindrical workpiece such that said device actuated the cylindrical workpiece to rotate when said work platform is driven to slide horizontally;
    the circumferencial surface of the cylindrical workpiece being spread out to form a finishing planar surface to facilitate the finishing of the circumferential surface of the cylindrical workpiece by said discharge finishing electrode at the time when the cylindrical workpiece is actuated by said workpiece holding device to rotate to pass a projection of said electrode on said work platform.

2. The machine as defined in claim 1, wherein said workpiece holding device comprises:
    a seat body mounted securely on said work platform;
    a chuck pivoted to said seat body and provided at one end thereof with a clamping portion for holding securely one end of the cylindrical workpiece, said chuck fastened at other end thereof with an axis of a wheel; and
    a cord wound on said wheel such that both ends of said cord are fastened with the platform base and located at two opposite sides of said seat body;
    said wheel being under the influence of a friction force of said cord wound on said wheel such that said wheel rotates on said axis of said wheel to actuate said chuck to turn the cylindrical workpiece around said axis at the time when said work platform is driven to displace horizontally in relation to said platform base.

3. The machine as defined in claim 2, wherein said workpiece holding device further comprises an urging pin which is fastened pivotally with said seat body such that said urging pin faces said clamping portion of said chuck for urging another end of the cylindrical workpiece.

4. The machine as defined in claim 3, wherein said seat body consists of a bottom board, a first fastening board, and a second fastening board, said bottom board being fastened with said work platform, said first fastening board and said second fastening board being fastened with said bottom board; wherein said chuck is fastened pivotally with said first fastening board; and wherein said urging pin is fastened pivotally with said second fastening board.

5. The machine as define in claim 2, wherein said platform base is provided with two support frames located at two opposite sides of said seat body; and wherein said cord are fastened at both ends thereof with said two support frames.

6. The machine as defined in claim 5, wherein said two support frames comprise a support rod and a cross rod, said support rod being fastened at one end thereof with said platform base, said cross rod being fastened at one end thereof with said support rod and at another end thereof with one end of said cord.

7. An electric discharge machine for effecting a finishing surface on the circumferential surface of a cylindrical workpiece such that the finishing surface is parallel to the circumferential surface of the cylindrical workpiece, said electric discharge machine comprising:
    a platform base;
    a work platform slidably mounted on said platform base such that said work platform slides horizontally in relation to said platform base;
    a main shaft seat slidably mounted on said platform base such that said main shaft seat slides along the direction of a normal line of said work platform;

a discharge finishing electrode fastened with said work platform; and a workpiece holding device comprising:

a fastening board fastened with one end of said main shaft seat such that said fastening board faces said work platform;

a chuck pivoted to said fastening board and provided at one end thereof with a clamping portion for holding one end of the cylindrical workpiece, said chuck fastened at other end thereof with axis of a wheel; and a cord wound on said wheel such that both ends of said cord are fastened with said work platform and located at two opposite sides of said fastening board;

said wheel being under the influence of a friction force of said cord wound on said wheel so as to rotate on the axis of said wheel to actuate said chuck to turn the cylindrical workpiece around the axis to force the circumferential surface of the cylindrical workpiece to spread out to form a planar surface opposite to said electrode in order to facilitate the finishing of the circumferential surface of the workpiece by said electrode at the time when said work platform is driven to slide horizontally in relation to said platform base.

8. The electric discharge machine as defined in claim 7, wherein said work platform is provided with two support rods fastened therewith such that said two support rods are located at two opposite sides of said fastening board; and wherein said cord is fastened at both ends thereof with said two support rods.

9. An electric discharge machine for effecting a finishing surface on a circumferential surface of a cylindrical workpiece, said electric discharge machine comprising:

a platform base;

a work platform slidably mounted on said platform base said work platform being slidable horizontally in relation to said platform base;

a main shaft seat slidably mounted on said platform base such that said main shaft seat slides along the direction of a normal line of said work platform;

a discharge finishing electrode fastened with one end of said main shaft seat such that said discharge finishing electrode is fixed with a planar side facing said work platform; and a workpiece holding device fastened on said work platform for holding securely the cylindrical workpiece such that said device actuated the cylindrical workpiece to rotate when said work platform is driven to slide horizontally;

the circumferencial surface of the cylindrical workpiece being spread out to form a finishing planar surface to facilitate the finishing of the circumferential surface of the cylindrical workpiece by said discharge finishing electrode at the time when the cylindrical workpiece is actuated by said workpiece holding device to rotate to pass a projection of said electrode on said work platform;

wherein said workpiece holding device comprises:

a seat body mounted securely on said work platform;

a chuck pivoted to said seat body and provided at one end thereof with a clamping portion for holding securely one end of the cylindrical workpiece, said chuck fastened at other end thereof with an axis of a wheel; and a cord wound on said wheel such that both ends of said cord are fastened with the platform base and located at two opposite sides of said seat body;

said wheel being under the influence of a friction force of said cord wound on said wheel such that said wheel rotates on said axis of said wheel to actuate said chuck to turn the cylindrical workpiece around said axis at the time when said work platform is driven to displace horizontally in relation to said platform base.

10. The machine as defined in claim 9, wherein said workpiece holding device further comprises an urging pin which is fastened pivotally with said seat body such that said urging pin faces said clamping portion of said chuck for urging another end of the cylindrical workpiece.

11. The machine as defined in claim 10, wherein said seat body consists of a bottom board, a first fastening board, and a second fastening board, said bottom board being fastened with said work platform, said first fastening board and said second fastening board being fastened with said bottom board; wherein said chuck is fastened pivotally with said first fastening board, and wherein said urging pin is fastened pivotally with said second fastening board.

12. The machine as define in claim 9, wherein said two support frames located at two opposite sides of said seat body; and wherein said cord are fastened at both ends thereof with said two support frames.

13. The machine as define in claim 12, wherein said two support frames comprise a support rod and a cross rod, said support rod being fastened at one end thereof with said platform base, said cross rod being fastened at one end thereof with said support rod and at another end thereof with one end of said cord.

\* \* \* \* \*